UNITED STATES PATENT OFFICE.

WILHELM WACHTER, OF ILMENAU, GERMANY, ASSIGNOR TO CARL FLEMMING, OF GLOGAU, GERMANY.

PROCESS OF TRANSFERRING METACHROMOTYPES UNDER GLAZE UPON CERAMIC OBJECTS.

SPECIFICATION forming part of Letters Patent No. 597,339, dated January 11, 1898.

Application filed August 16, 1897. Serial No. 648,432. (No specimens.)

*To all whom it may concern:*

Be it known that I, WILHELM WACHTER, a subject of the Grand Duke of Saxe-Weimar, and a resident of Ilmenau, in the Grand Duchy of Saxe-Weimar, Germany, have invented a new and useful Process for Transferring Metachromotypes Under the Glaze Upon Ceramic Objects, of which the following is an exact specification.

This invention refers in general to a method of transferring metachromotypes upon ceramic objects, and in particular to doing this under the glaze by means of the well-known method of transfers.

My improved method is carried out as follows: The ceramic objects after having been burned the first time are coated with a solution of vegetable resin in methyl or ethyl alcohol, having an addition of varnish and liquid glue. The substances are carefully mixed and the mixture then applied to the articles to be coated either by means of a brush or by dipping, said articles having already been burned the first time. The surfaces of the ceramic objects are then able to receive the metachromotypes, and the latter are then applied to said objects in the known way. Owing, however, to the presence of resin in the liquor aforementioned the glazing does not adhere to the surfaces that have been treated with the said liquor. To bring this about, I coat the surfaces, together with the metachromotype, with an aqueous solution of gum-arabic, dextrine, tragacanth, or agar-agar. The glazing is applied to the surfaces before said solution has become dry, and the ceramic objects are then placed into the glaze-kiln and burned the second time, whereupon the design is under the glaze.

By employing the method before described I gain the advantage, first, of being able to perfectly dispense with burning the ceramic objects within a muffle, and the metachromotypes are thus prevented from being damaged or destroyed by the same, cracking off or being entirely ruined, which frequently occurs in a muffle, and, second, that only one burning is necessary—namely, the glaze-burning, in which the metachromotype is consumed without any risk.

The method as described is especially applicable for so-called "film" or "foil" metachromotypes. To make it suitable or applicable for india-rubber metachromotypes, the ceramic objects after having been burned the first time are first provided with a layer of raw glazing and then with the solution of a vegetable resin. The india-rubber metachromotype is now affixed to the ceramic object, and there follows the coating with the other solution and finally the main layer of the glazing.

It is immaterial which sort or kind of metachromotype is used. In each case the necessity of the muffle, as well as the flux, is obviated and the design can be produced in any color by one burning—namely, the glaze-burning.

Having thus fully described the nature of this invention, what I desire to secure by Letters Patent of the United States is—

1. The process of transferring metachromotypes under the glaze upon ceramic objects, having been burned the first time, which consists in the application to the said objects of a coating of alcoholic shellac, varnish and liquid glue, onto or upon which coating, the metachromotype is transferred; subsequent thereto, covering the metachromotype and the first-mentioned coating with an aqueous solution of gum-arabic or dextrine and finally the application of the glaze, substantially as described.

2. The process of transferring india-rubber metachromotypes under the glaze upon ceramic objects having been burned the first time, which consists in the application in the first instance of a coating of raw glaze; subsequent thereto the application of a coating of alcoholic shellac, varnish and liquid glue, onto or upon which coating, the india-rubber metachromotype is transferred; further consisting in applying to the india-rubber metachromotype and the before-mentioned coating, an aqueous solution of gum-arabic or dextrine, and finally the application of the glaze all substantially as described.

In testimony whereof I have signed this specification in the presence of two subscribing witnesses.

WILHELM WACHTER.

Witnesses:
JULIUS HAEMECKE,
FRITZ SPERLING.